Figure 2:
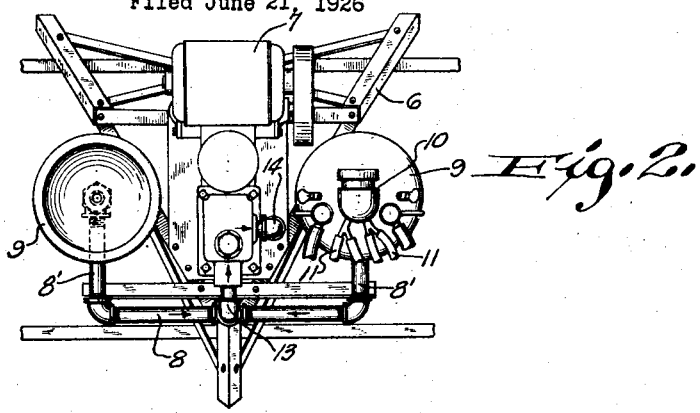

May 10, 1927.

B. F. BEATY

DAIRY EQUIPMENT CLEANER

Filed June 21, 1926

1,627,824

INVENTOR.
Bruce F. Beaty.
BY
Morsell, Keeney & Morsell.
ATTORNEYS.

Patented May 10, 1927.

1,627,824

UNITED STATES PATENT OFFICE.

BRUCE F. BEATY, OF WAUKESHA, WISCONSIN, ASSIGNOR TO THE UNIVERSAL MILKING MACHINE CO., OF WAUKESHA, WISCONSIN, A CORPORATION OF WISCONSIN.

DAIRY-EQUIPMENT CLEANER.

Application filed June 21, 1926. Serial No. 117,436.

This invention relates to improvements in dairy equipment cleaners.

It is one of the objects of the present invention to provide a dairy equipment cleaner arranged to cause a continuous circulation of the cleaning fluid through the cups, tubes, and pulsator of a milking machine or other dairy equipment.

A further object of the invention is to provide a pump type cleaner of the class described.

A further object of the invention is to provide a dairy equipment cleaner which will clean a plurality of milking machines or other dairy equipment devices simultaneously.

A further object of the invention is to provide a dairy equipment cleaner which is of very simple construction, is strong and durable, is efficient and automatic in operation, and is well adapted for the purposes described.

With the above and other objects in view, the invention consists of the improved dairy equipment cleaner and its parts and combinations as set forth in the claims, and all equivalents thereof.

Figure 1:
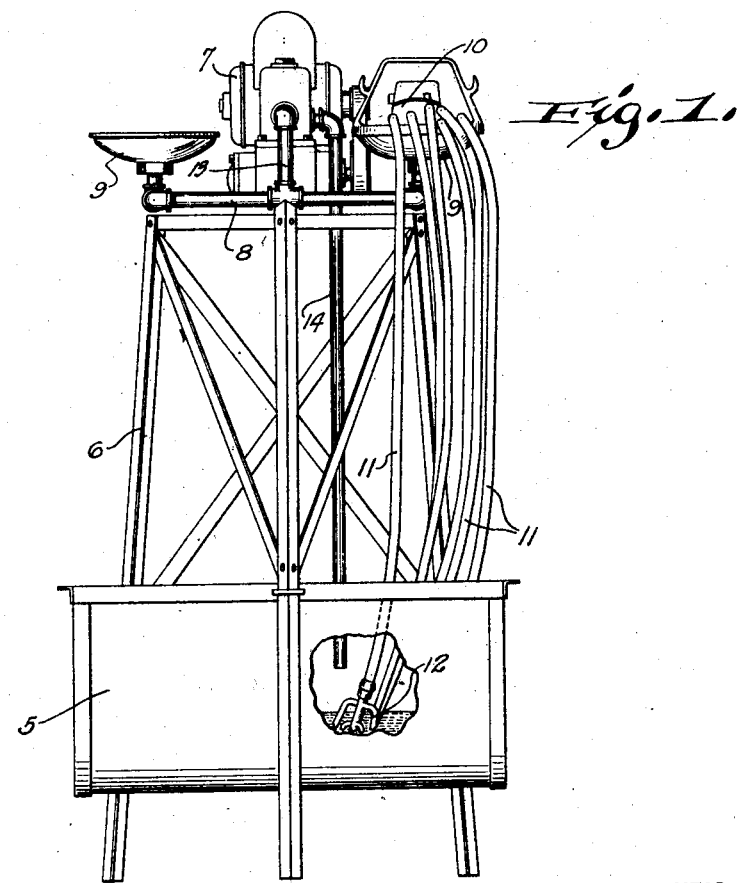

In the accompanying drawing in which the same reference characters indicate the same parts in both of the views:

Fig. 1 is a front view of the improved dairy equipment cleaner showing a milking machine engaged thereby for cleaning; and Fig. 2 is a plan view thereof.

Referring now more particularly to the drawing, it will appear that the numeral 5 indicates a tub of any suitable design and adapted to be filled with a cleaning fluid, preferably hot water.

A supporting member 6 extends upwardly from the tub and carries a fluid pump 7 which is motor driven and of any of the commercal types of pumps. A horizontal pipe 8, engaged by the upper portion of the support, extends across one face of the pump and two or more branch pipes 8' extend therefrom and a bowl member 9 is carried by each branch pipe, said bowl members having lower drain openings in register with the ends of their respective branch pipes.

Said bowl members are adapted to have seated thereon the pulsator and lid of a milking machine, as shown at the right in Figs. 1 and 2, and indicated by the numeral 10. The tubes 11 of the milking machine, both air and milk, depend downwardly and their lower end portions, including the milk cups 12, are submerged in the fluid within the tank 5.

The operation of the device is as follows:

The milking machines to be cleaned, which may be of the pulsator type, are placed on the bowls, as explained. The tub 5 is filled with a correct amount of hot water and the pump 7 is set in operation. The inlet side of the pump is connected by means of a pipe 13 with a medial portion of the main pipe 8 and the discharge or outlet side of the pump has connected thereto a pipe or tube 14 which depends into the tub 5. The action of the pump will draw fluid from the tub up through the tubes of the milking machines and through the pulsators of the same and then into the pipes 8 and 8', through the bowl openings. The fluid from all of the branch pipes then is drawn from the pipe 13 into the pump and discharged from the pump through the tube 14 into the tub. The cycle is thus repeated until the machines are sufficiently cleaned.

While the drawing shows and the specification describes the device as cleaning a milking machine, it is to be understood that the device is also adapted for use in cleaning and sterilizing other dairy or mechanical equipment of a tubular and hollow character.

From the foregoing description it will be seen that the cleaner readily, automatically, cleans a plurality of milking machines or other dairy devices, is of very simple and novel construction, and is well adapted for the purpose set forth.

What I claim as my invention is:

1. A dairy equipment cleaning device comprising a tank, a support adapted to receive a milking machine pulsator unit with the cup leads immersed in said tank, and a pump in communication with the tank and the support.

2. In combination, a tank, a plurality of apertured bowls supported thereabove, a pump having its outlet communicating with the tank, and a connection between said bowls and the pump inlet, each of said bowls being adapted to support the pulsator unit of a milking machine with its tubes extending into said tank, said arrangement permitting a circulation of fluid from the tank through the milking machine and connections and into the pump and back to the tank.

In testimony whereof, I affix my signature.

BRUCE F. BEATY.